(12) United States Patent
Jeong et al.

(10) Patent No.: US 9,571,805 B2
(45) Date of Patent: Feb. 14, 2017

(54) DISPLAY APPARATUS

(71) Applicants: Youngho Jeong, Goyang-si (KR);
Soonwook Hong, Paju-si (KR)

(72) Inventors: Youngho Jeong, Goyang-si (KR);
Soonwook Hong, Paju-si (KR)

( * ) Notice: Subject to any disclaimer, the term of this patent is extended or adjusted under 35 U.S.C. 154(b) by 0 days.

(21) Appl. No.: 14/988,775

(22) Filed: Jan. 6, 2016

(65) Prior Publication Data

US 2016/0249026 A1    Aug. 25, 2016

(30) Foreign Application Priority Data

Feb. 24, 2015    (KR) .................. 10-2015-0025788

(51) Int. Cl.
*H04N 9/31* (2006.01)
*H04N 9/16* (2006.01)

(52) U.S. Cl.
CPC ............. *H04N 9/3155* (2013.01); *H04N 9/16* (2013.01); *H04N 9/312* (2013.01); *H04N 9/317* (2013.01); *H04N 9/3129* (2013.01); *H04N 9/3141* (2013.01)

(58) Field of Classification Search
CPC .................................... H04N 9/3185
USPC .......................................... 348/745
See application file for complete search history.

(56) References Cited

U.S. PATENT DOCUMENTS

| 5,844,713 | A  | * | 12/1998 | Nanba ................ G02B 27/0172 359/364 |
| 6,611,241 | B1 | * | 8/2003  | Firester ................... H04N 9/12 345/1.1 |
| 7,158,280 | B2 | * | 1/2007  | Sandstrom ............ G02B 26/00 356/138 |
| 2006/0158454 | A1 | * | 7/2006 | Heynderickx ......... G09G 5/026 345/589 |

(Continued)

FOREIGN PATENT DOCUMENTS

| JP | 2005123841    | 5/2005  |
| JP | 2007298979    | 11/2007 |
| KR | 1020030015949 | 2/2003  |

OTHER PUBLICATIONS

English abstract of 2007298979.
English abstract of 1020030015949.
English abstract of 2005123841.

*Primary Examiner* — Brian Yenke
*Assistant Examiner* — Justin Sanders
(74) *Attorney, Agent, or Firm* — Antonio Ha & U.S. Patent, LLC

(57) ABSTRACT

A display apparatus comprises an image output module for outputting an image, a projection module for generating an image through a light source and projecting the generated image to the image output module, and a case having an opaque inside. The projection module and the image output module are connected to two opposite ends, respectively, of the case. The projection module includes a light source, a driving circuit for driving the projection module, a scan line (Continued)

forming module for forming a scan line according to a particular pattern previously defined, a short focal-length lens, and an inverting circuit for left-to-right inverting the generated image, wherein the scan line is formed by switching on or off a pixel according to the particular pattern for an image signal generated through the light source, and wherein the generated image is projected to the image output module through a rear projection scheme.

13 Claims, 9 Drawing Sheets

(56) References Cited

U.S. PATENT DOCUMENTS

2009/0244024 A1* 10/2009 Kurahashi ............... G06F 3/045
345/173
2016/0088270 A1* 3/2016 Candry .................. G03B 21/26
348/789

* cited by examiner

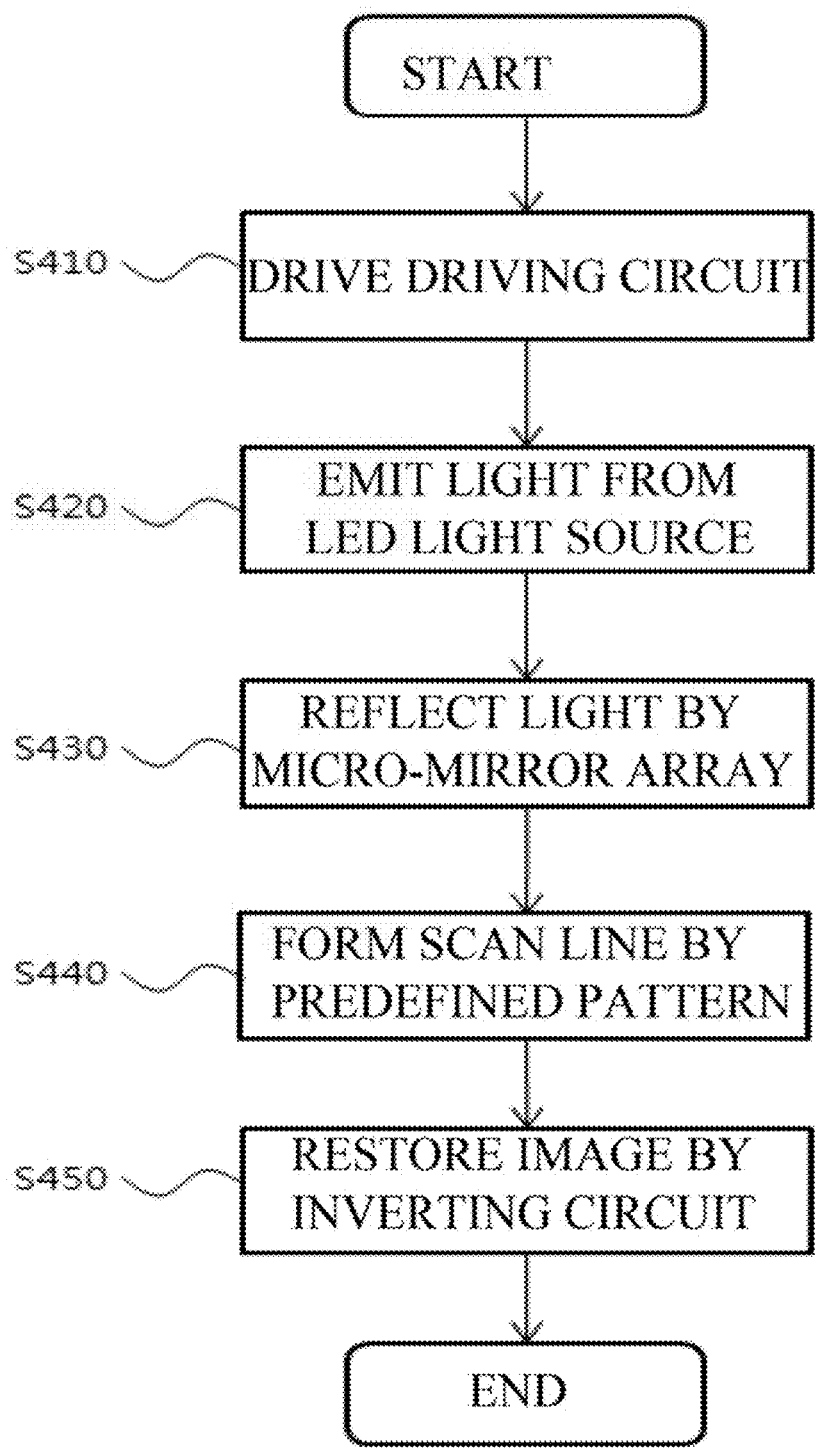

Fig. 5
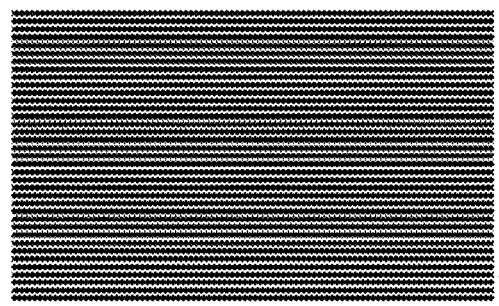
(a)
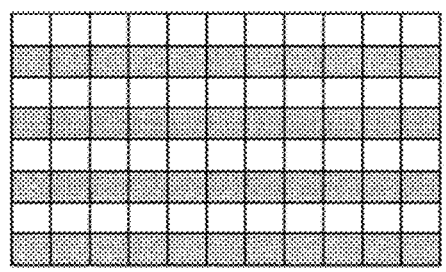
(b)
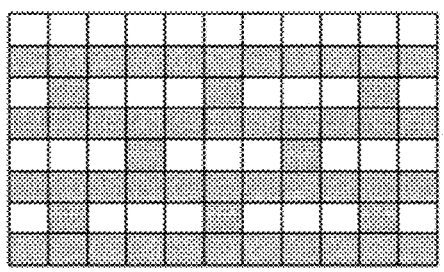
(c)

Fig. 6
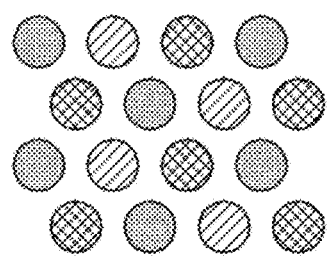
(a)
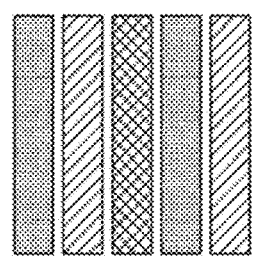
(b)
RED
GREEN
BLUE
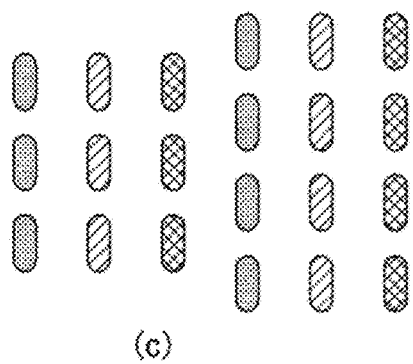
(c)

Fig. 8
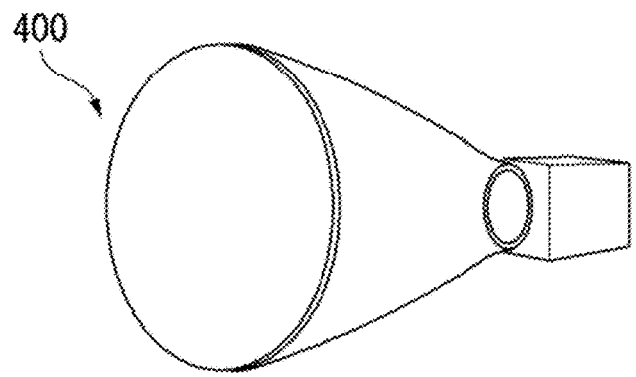
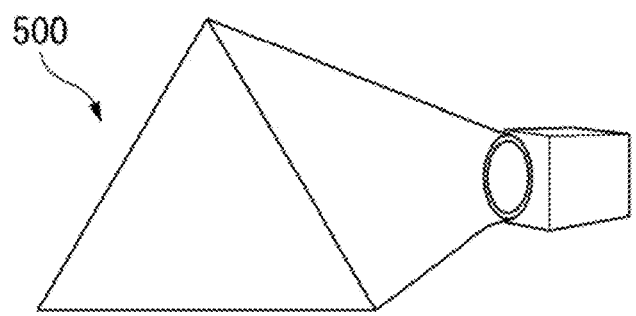
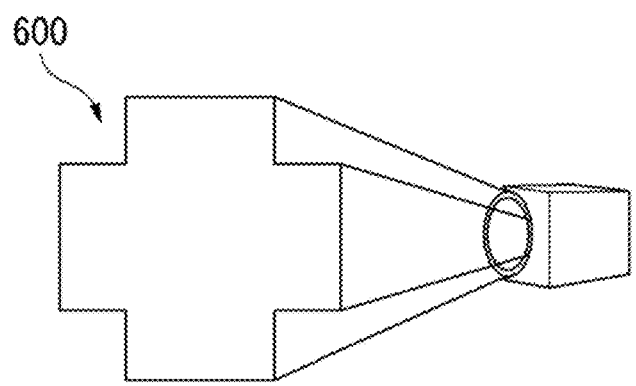

DISPLAY APPARATUS

CROSS-REFERENCE TO RELATED APPLICATIONS

This patent application claims priority under 35 U.S.C. §119 to Korean Patent Application No. 10-2015-0025788, filed on Feb. 24, 2015, in the Korean Intellectual Property Office, the disclosure of which is incorporated by reference herein in its entirety.

TECHNICAL FIELD

The present disclosure concerns displays, and more particularly, to projection displays.

DISCUSSION OF RELATED ART

The advent of information technology society led to growing demand for displays, and there is ongoing research and development for various types of displays including cathode ray tube (CRT) displays, projection displays, liquid crystal displays (LCDs), plasma display panels (PDPs), electro-luminescent displays (ELDs), and vacuum fluorescent displays (VFDs).

Conventional CRT or projection displays are too bulky and heavy, and flat panel displays are pricey particularly when implemented in a large size.

SUMMARY

According to an embodiment of the present disclosure, a display apparatus comprises an image output module for outputting an image, a projection module for generating an image through a light source and projecting the generated image to the image output module, and a case having an opaque inside, wherein the projection module and the image output module are physically connected to two opposite ends, respectively, of the case. The projection module includes a light source for emitting light, a driving circuit for driving the projection module, a scan line forming module for forming a cathode ray tube (CRT)-type scan line according to a particular pattern previously defined, a short focal-length lens, and an inverting circuit for left-to-right inverting the generated image. The CRT-type scan line is formed by switching on or off a pixel according to the particular pattern for an image signal generated through the light source. The generated image is projected to the image output module through a rear projection scheme. The light source is a light emitting diode (LED). The rear projection scheme is performed by the short focal-length lens.

The scan line forming module includes a micro-mirror array including at least one micro-mirror, and a process functionally connected with the micro-mirror array. The processor performs control to form the scan line according to the particular pattern by controlling a rotation angle of each micro-mirror to switch on or of the pixel corresponding to the micro-mirror.

The image output module includes a transparent layer and a film screen for rear projection. The transparent layer and the film screen are formed of plastic.

The particular pattern is any one of a shadow mask pattern, an aperture grille pattern, or a slot mask pattern.

The shape of the image projection module and the case is varied by adjusting an area where an image is projected and an area where the image is blocked.

According to an embodiment of the present disclosure, a display apparatus comprises an image output module for outputting an image, a projection module for generating an image through a light source and projecting the generated image to the image output module, and a case having an opaque inside. The image output module includes a transparent layer and a film screen for rear projection formed of plastic. The film screen has a particular pattern printed thereon to form a scan line. The projection module and the image output module are physically connected with two opposite ends, respectively, of the case. The projection module includes an inverting circuit for left-to-right inverting the generated image. The generated image is projected to the image output module through a rear projection scheme.

The particular pattern is any one of a shadow mask pattern an aperture grille pattern, or a slot mask pattern.

The shape of the image projection module and the case is varied by adjusting an area where an image is projected and an area where the image is blocked.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 4 is a flowchart illustrating a method for forming a scan line by a display apparatus according to an embodiment of the present disclosure;

FIG. 5 illustrates an example of implementing a scan line using a display apparatus according to an embodiment of the present disclosure;

FIG. 6 illustrates examples of predetermined patterns previously input to a projection module to form a scan line, according to an embodiment of the present disclosure;

FIG. 8 illustrates examples of screens of a display apparatus according to an embodiment of the present disclosure.

DETAILED DESCRIPTION OF EXEMPLARY EMBODIMENTS

Hereinafter, exemplary embodiments of the inventive concept will be described in detail with reference to the accompanying drawings. The inventive concept, however, may be modified in various different ways, and should not be construed as limited to the embodiments set forth herein. As used herein, the singular forms "a," "an," and "the" are intended to include the plural forms as well, unless the context dearly indicates otherwise. It will be understood that when an element or layer is referred to as being "on" or "connected to" another element or layer, it can be directly on or connected to the other element or layer, or intervening elements or layers may be present.

As used herein, the terms "module" and "unit" may be interchangeably used.

Figure 1:
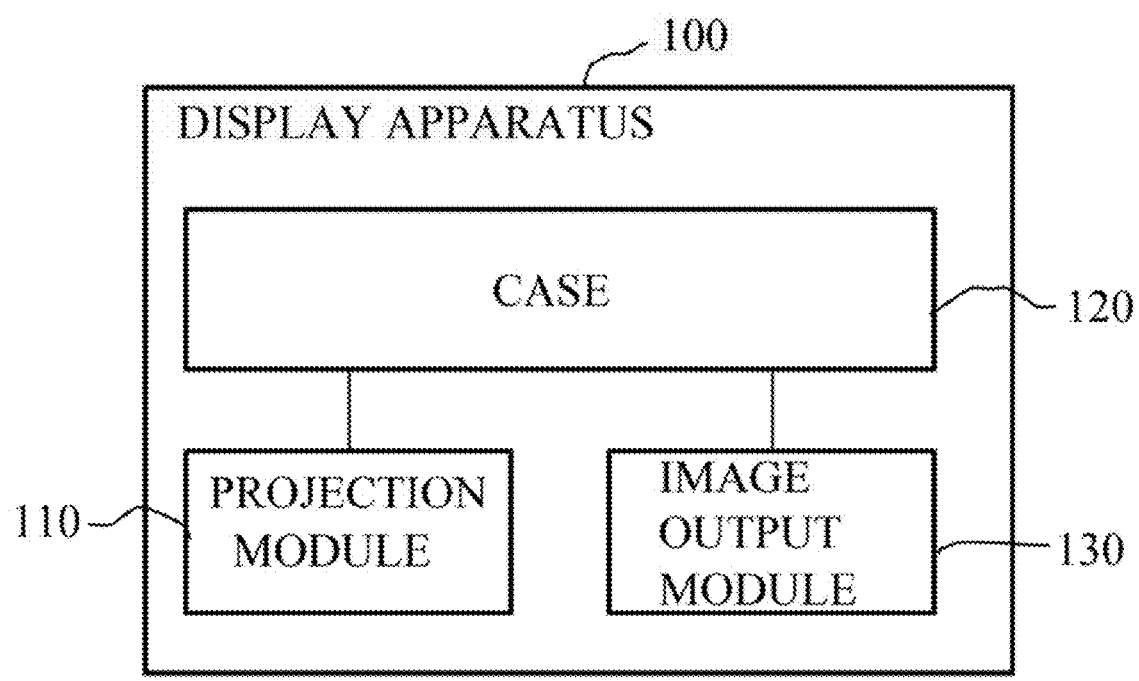
FIG. 1 is a block diagram illustrating a display apparatus according to an embodiment of the present disclosure.
Figure 2:
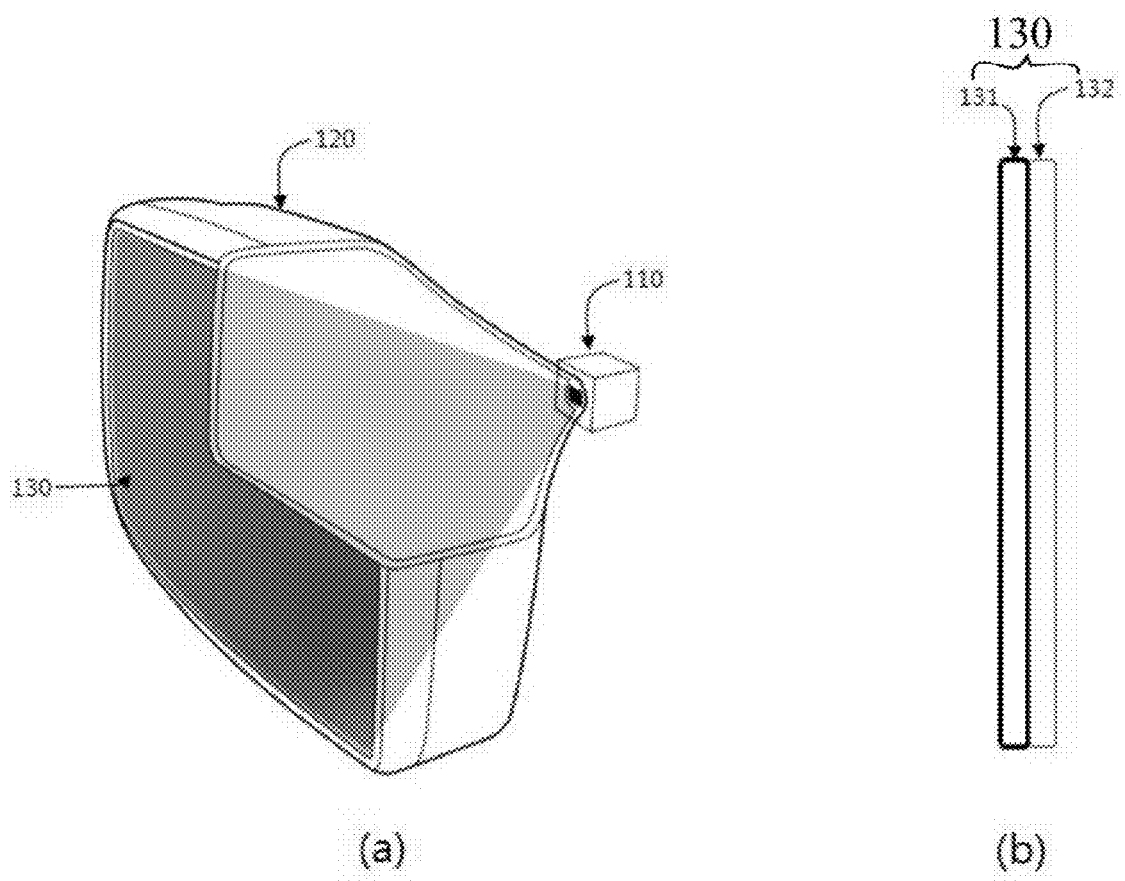
FIG. 2 illustrates an example of an implementation of a display apparatus according to an embodiment of the present disclosure.

FIG. 1 is a block diagram illustrating a display apparatus according to an embodiment of the present disclosure. FIG. 2 illustrates an example of an implementation of a display apparatus according to an embodiment of the present disclosure.

Referring to FIGS. 1 and 2, the display apparatus 100 may include an image output module 130, a case 120, and a projection module 110.

The case 120 may have an opaque inside. For example, an inside of the case 120 may be treated to be opaque so that an image from the projection module 110 may be clearly projected to the image output module 130. For example, the case 120 may function as a darkroom or may provide a darkroom.

The case 120 may be physically connected with each of the image output module 130 and the projection module 110. The image output module 130 and the projection module 110, respectively, may be connected to two opposite ends or sides of the case 120. The two opposite ends or sides of the case 120 may have various shapes for connection with the image output module 130 and the projection module 110.

For example, a case for the CRT may be used as the case 120.

However, embodiments of the present disclosure are not limited thereto. Alternatively, other various types or shapes of cases that may function as a darkroom or transparent, semi-transparent, or translucent casing that does not have art opaque inside (e.g., a casing formed of translucent glass) may be used as the case 120.

The projection module 110 may be an image source that may project images. The projection module 110 may be positioned behind the case 120 and may be directly connected with the case 120.

For example, the projection module 110 may be detachably or integrally connected with the case 120.

The projection module 110 may include various modules to project images to the image output module 130. For example, the projection module 110 may include a light emitting diode (LED) light source 111, a driving circuit 112, an inverting circuit 113, a scan line forming module 114, and a lens 115. These components a the projection module 110 are described below with reference to FIG. 3.

The projection module 110 may be a small-sized beam projection module adopting, e.g., digital light processing (DLP) that uses an LED as its light source. By using such small-sized DLP beam projection module, a sufficient amount of light for screen may be secured even when the case 120 is transparent or translucent. For example, the projection module 110 may be a DLP projector.

The projection module 110, when using an LED(s) as its light source, may operate at a lower power level (e.g., about 12V) as compared with CRT displays.

The image output module 130 is positioned ahead of the case 120 and is directly connected with the case 120. The image output module 130 and the case 120 may be detachably or integrally connected with each other.

The image output module 130 may display an image projected from the projection module 110. Such way may be referred to as rear projection.

Referring to FIG. 2(b), the image output module 130 may include a transparent layer 131 and a film screen 132 for rear projection. The image output module 130 may form a surface where an image is projected (simply referred to as an image projection surface).

The transparent layer 131 and the film screen 132 may be attached to each other.

The transparent layer 131 and the film screen 132 may be formed of plastic.

The image output module 130 may be flat or curved. For example, the transparent layer 131 and the film screen 132 of the image output module 130 may be flat, and even when curved, the transparent layer 131 and the film screen 132 may correctly display an image projected from the projection module 110.

The projection module 110 may project an image from behind the case 120 to the image output module 130. The case 120 has an opaque inside. Accordingly, the image from the projection module 110 may be clearly projected to the image output module 130.

For example, the display apparatus 100 may adopt such rear projection, thereby leading to a simplified structure and minimized image quality deterioration.

Unlike conventional projection TVs, the display apparatus 100 may directly project images to the image output module 130 without reflection by a mirror. The image output module 130 and the case 120 are formed of plastic. Thus, the case 120 and the image output module 130 may be flexibly designed. This is described below in greater detail.

Figure 3A:
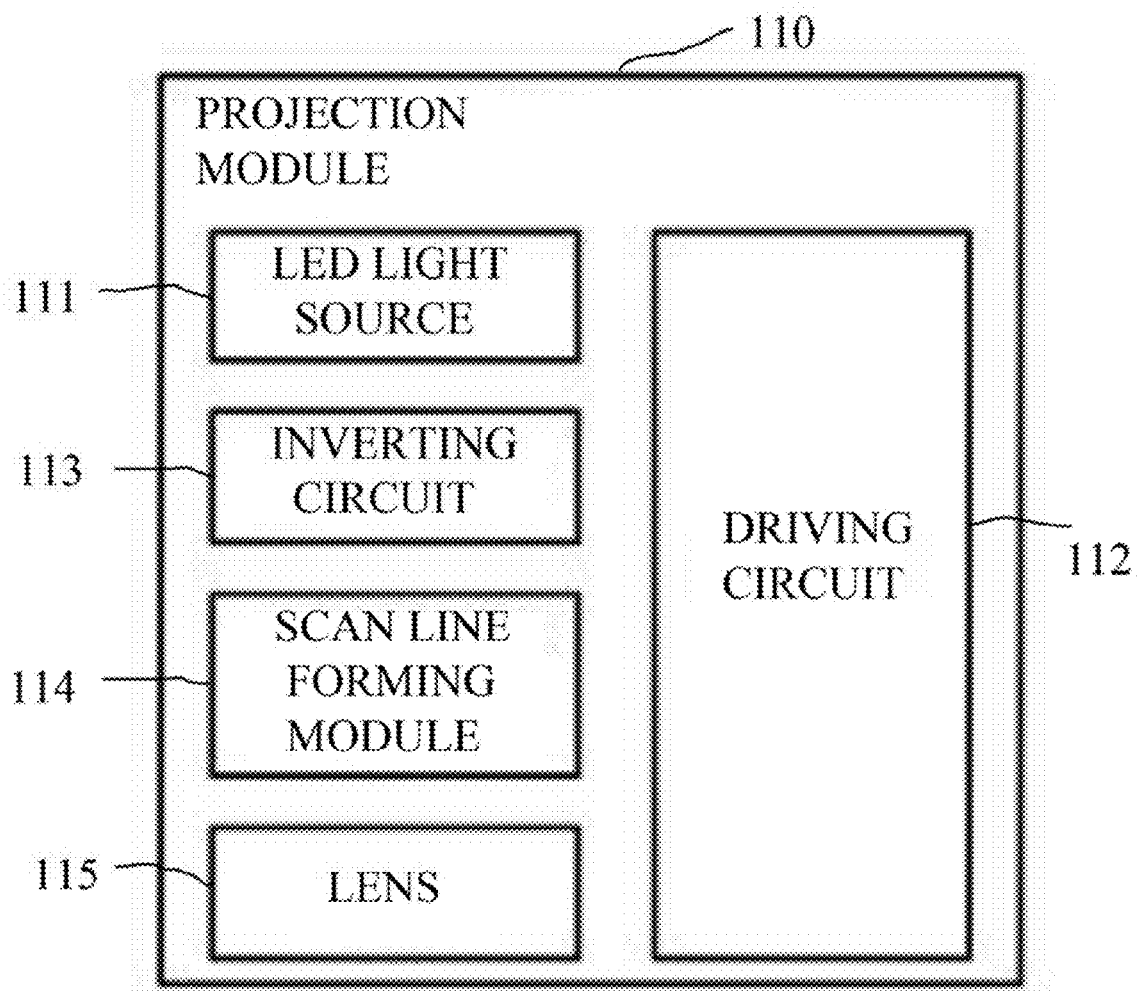
FIG. 3A is a block diagram illustrating a projection module according to an embodiment of the present disclosure.
Figure 3B:
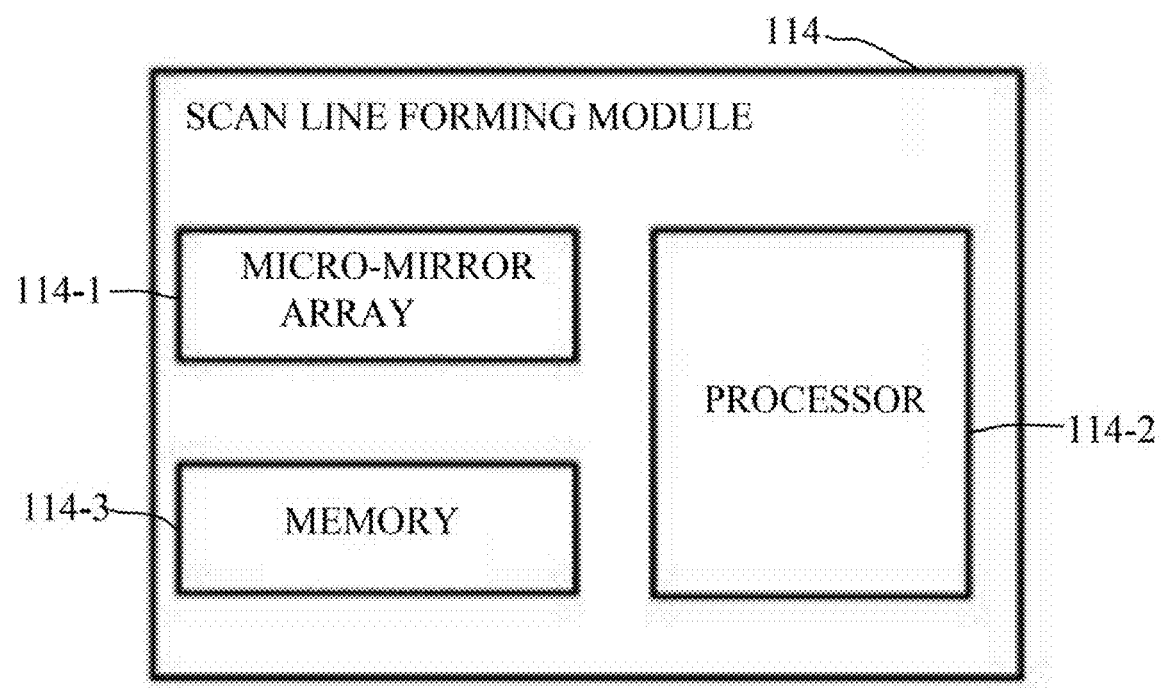
FIG. 3B is a block diagram illustrating a scan line forming module according to an embodiment of the present disclosure.

FIG. 3A is a block diagram illustrating a projection module according to an embodiment of the present disclosure. FIG. 3B is a block diagram illustrating the scan line forming module included in the projection module of FIG. 3A, according to an embodiment of the present disclosure;

Referring to FIG. 3, the projection module 110 may include an LED light source 111, a driving circuit 112, an inverting circuit 113, a can line forming module 114, and a lens 115.

The LED light source 111 is a light some that emits light to output an image signal. However, embodiments of the present disclosure are not limited to the LED light source. Other various light sources than the LED light source may be used as the light source.

The driving circuit 112 enables reception of an image signal from an outside source (not shown) and output of the image signal.

The inverting circuit 113 may invert left and right portions of an image outputted.

An image projected from the projection module 110 to the image output module 130 may be left-to-right inverted due to the adoption of rear projection and thus the left-to-right inverted image may be output to the image output module 130.

The inverting circuit 112 may restore the left-to-right inverted output image back to the original image.

The scan line forming module 114 may be a device to form scan lines that is formed through interlaced scanning of CRT.

The scan line forming module 114 may implement pixels by controlling the rotation angle of micro-mirrors respectively corresponding to the pixels in order to receive an image signal via a light source (e.g., the LED light source 111) and form as predetermined scan line pattern to output an image.

The scan line forming module 114 may include a micromirror array 114-1 including at least one micro-mirror, a processor 114-2, and a memory 114-3.

For example, the LED light source 111 emits light to output an image signal.

The micro-mirror array 114-1 reflects the light emitted from the LED light source 111. Each micro-mirror of the micro-mirror array 114-1 corresponds to a pixel and reflects light from the LED light source 111 based on a predetermined rotation angle.

The micro-mirror array 114-1 may be a digital micro-mirror device (DMD), for example.

The processor 114-2 may control the overall operation of the projection module 110.

The processor 114-2 may adaptively control the rotation angle of each micro-mirror in the micro-mirror array 114-1 to switch on/off the pixel corresponding to the micro-mirror, thereby forming a scan line according to a predetermined pattern previously defined and inputted.

The processor 114-2 may include a switching module (not shown) and a control circuit (not shown) to control the switching module.

The processor 114-2 may be, but is not limited to, a controller, a micro-controller, or a micro-processor. The processor 114-2 may be implemented in hardware, software or a combination thereof.

The processor 114-2 may include, but is not limited to, an application-specific integrated circuit (ASIC), other chipsets, a logic circuit, and or a data processing device.

According to an embodiment of the present disclosure, the scan line forming module 114 may further include a color filter(s) and a memory.

The scan line forming module 114 may enable an image projected from the projection module 110 to have a color by transmitting light from the LED light source 111 through the color filter(s).

The memory 114-3 may retain a program for the operation of the processor 114-2 and may temporarily store input/output data.

The memory 114-3 may be a medium or device to store various types or pieces of information including the foregoing or other information or data. The memory 114-3 may be connected with the processor 114-2 to store a program for the operation of the processor 114-2 and input/output data.

According to an embodiment of the present disclosure, the memory 114-3 may previously retain a pattern for forming a scan line, and when an operation for forming a scan line is performed, the memory 114-3 may transfer the pattern to the processor 114-2 to form a scan line.

The memory 114-3 may include a storage medium of at least one of a flash memory, a hard disk, a micro-multimedia card (MMC), a secure digital (SD) memory, an extreme digital (xD) memory, a random access memory (RAM), a static RAM (SRAM), a read-only memory (ROM), an electrically erasable programmable ROM (EEPROM), a programmable ROM (PROM), a magnetic memory, a magnetic disk, or an optical disk.

The scan line forming module 114 may be used when forming a scan line on the image output module 130 of the display apparatus 100 and may be stopped from use when forming no scan line.

The lens 115 may transmit and magnify light emitted from the LED light source 111. The lens 115 may be a lens that enables a shorter projection distance, e.g., a short focal-length lens. Thus, the display apparatus 100 may achieve rear projection even without use of mirror reflection.

According to an embodiment of the present disclosure, the display apparatus 100 may include more components other than those shown in FIGS. 1 to 3, or alternatively, some components of the display apparatus 100 may be omitted.

FIG. 4 is a flowchart illustrating a method for forming a scan line by a display apparatus according to an embodiment of the present disclosure.

The display apparatus 100 activates or runs the driving circuit 112 to receive an image signal (S410).

The display apparatus 100 generates light to output the received image signal through the LED light source 111 (S420).

The display apparatus 100 reflects the light from the LED light source 111 be the micro-mirror array 114-1 (S430). Each micro-mirror of the micro-mirror array 114-1 corresponds to a pixel and reflects the light from the LED light source 111 based on a predetermined rotation angle.

The display apparatus 100 forms a scan line according to a pre-defined pattern by (adaptively) controlling the rotation angle of each micro-mirror of the micro-mirror array 114-1 (e.g., by performing control to switch on off pixels (e.g., odd-numbered rows of pixels or even-numbered rows of pixels) respectively corresponding to the micro-mirrors (S440).

The display apparatus 100 restores a left-to-right inverted image back to the original image via the inverting circuit 113 and outputs the original image to the image output module 130 (S450).

FIG. 5 illustrates an example of implementing a scan line using a display apparatus according to an embodiment of the present disclosure.

(a) of FIG. 5 illustrates an example of scan lines formed using a DLP projector according to an embodiment of the present disclosure, and (b) and (c) of FIG. 5 illustrate examples in which the micro-mirrors of the DLP projector are controlled to produce pixels prevented from light transmission.

As illustrated in (b) and (c) of FIG. 5, dark portions indicate pixels where light transmission has been prevented.

As such, a predetermined scan line pattern may be previously set and input to the projection module 110, and the rotation of the micro-mirrors may be controlled according to the scan line pattern to implement a scan line.

For example, a scan line may be formed using a predetermined pattern and at least one user selectable switching module that may control the switch-on/off of each pixel of the projection module 110 before a signal is input.

FIG. 6 illustrates examples of predetermined patterns previously input to a projection module 110 to form a scan line, according to an embodiment of the present disclosure.

(a), (b), and (c) of FIG. 6 illustrate a shadow mask pattern, an aperture grille pattern, and a slot mask pattern, respectively.

Such pattern may be previously defined and input to the DLP projector, forming a scan line.

The patterns illustrated in FIG. 6 are mere examples, and other various patterns may also be provided, without limited thereto.

Figure 7:
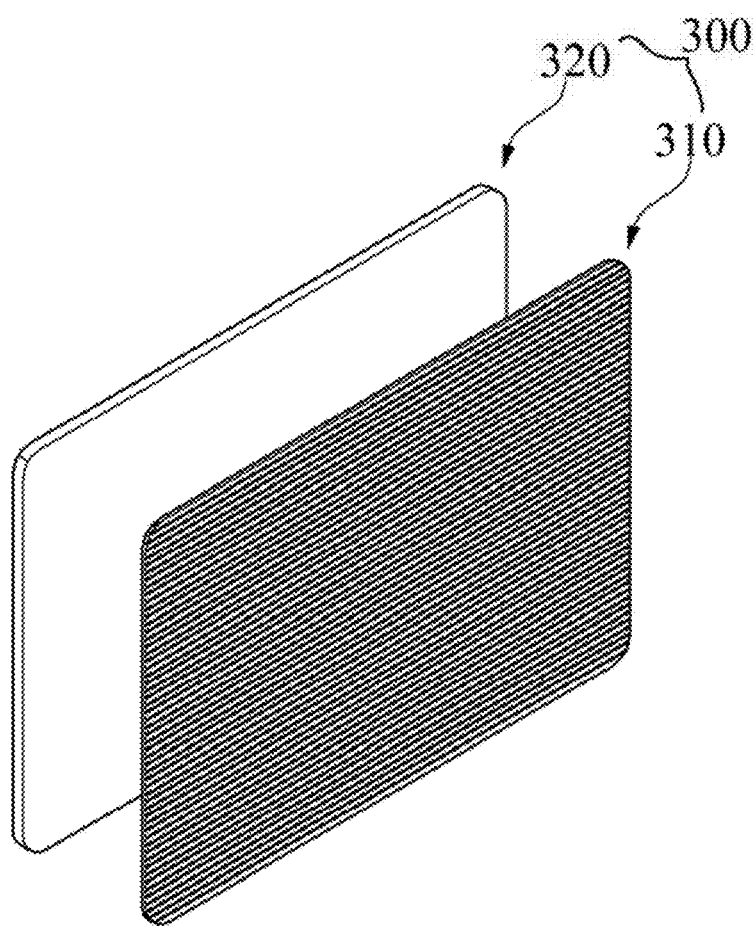
FIG. 7 is a view illustrating a method for forming a scan line by a display apparatus according to an embodiment of the present disclosure.

FIG. 7 is a view illustrating a method for forming a scan line by a display apparatus according to an embodiment of the present disclosure.

In the instant embodiment, an image output module 300 itself may include a scan line pattern to form a scan line rather than using a projection module (e.g. the projection module 110) as compared with the embodiment described above in connection with FIGS. 1 through 6.

For example, the image output module 300 includes a transparent layer 320 and a rear projection film 310.

A pattern as illustrated in FIG. 6, e.g., a shadow mask pattern, an aperture grille pattern, or a slot mask pattern, may be printed on the rear projection film 310.

The pattern-printed rear projection film 310 may be attached to a rear surface of the transparent layer 320. The image output module 300 may form a surface to which an image is projected (hereinafter, simply referred to as an image projection surface).

When an image is projected from the projection module 110 to the image projection surface, the image output module 300 may form a scan the corresponding to the projected image.

FIG. 8 illustrates examples of screens of a display apparatus according to an embodiment of the present disclosure.

Referring to FIG. 8, the display apparatus may have various shapes of cases and screens.

For example, the display apparatus may directly project an image to the image projection surface without mirror reflection unlike existing projection TVs.

The case and the image output module may be formed of plastic and may be easily manufactured flexibly in various shapes or designs.

The image projection surface may be rendered to have various shapes by varying the shape of a projection area where an image is displayed and a masked area where an image is not displayed.

For example, the image projection surface 300 may be formed to have various shapes, including a circle 400, a triangle 500, or a cross 600 as illustrated in FIG. 8.

The display apparatus 100 may be used standalone or equipped in a separate space, e.g., a cabinet.

Thus, various shapes or forms of display apparatuses may be achieved that cannot be implemented via the LCD.

According to embodiments of the present disclosure, lightweight, compact, and cost-saving display apparatuses may be implemented.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A display apparatus, comprising:
   an image output module for outputting an image;
   a projection module for generating an image through a light source and projecting the generated image to the image output module; and
   a case,
   wherein the projection module and the image output module are physically connected to two opposite ends, respectively, of the case,
   wherein the projection module includes:
   a light source for emitting light; a driving circuit for driving the projection module;
   a scan line forming module for forming a cathode ray tube (CRT)-type scan line according to a particular pattern previously defined;
   a short focal-length lens; and
   an inverting circuit for left-to-right inverting the generated image,
   wherein the light source is a light emitting diode (LED),
   wherein the CRT-type scan line is formed by switching on or off a pixel according to the particular pattern for an image signal generated through the light source,
   wherein the generated image is projected to the image output module through a rear projection scheme,
   wherein the image output module is positioned ahead of the case, and is directly connected with the case,
   wherein the projection module is positioned behind the case, and
   wherein the rear projection scheme is to project the generated image to the image output module directly without reflection by a mirror.

2. The display apparatus of claim 1, wherein the rear projection scheme is performed by the short focal-length lens,
   wherein the scan line forming module includes a micro-mirror array including at least one micro-mirror and a processor functionally connected with the micro-mirror array, and
   wherein the processor performs control to form the scan line according to the particular pattern controlling a rotation angle of each micro-mirror to switch on or off the pixel corresponding to the micro-mirror.

3. The display apparatus of claim 1, wherein the image output module includes a transparent layer and a film screen for rear projection, and wherein the transparent layer and the film screen are formed of plastic.

4. The display apparatus of claim 1, wherein the particular pattern is any one of a shadow mask pattern, an aperture grille pattern, or a slot mask pattern.

5. The display apparatus of claim 1, wherein a shape of the image projection module and the case is varied by adjusting an area where an image is projected and an area where the image is blocked.

6. A display apparatus, comprising:
   an image output module for outputting an image;
   a projection module for generating an image through a light source and projecting the generated image to the image output module; and
   a case,
   wherein the image output module includes a transparent layer and a film screen for rear projection formed of plastic,
   wherein the film screen has a particular pattern printed thereon to form a scan line,
   wherein the projection module and the image output module are physically connected with two opposite ends, respectively, of the case,
   wherein the projection module includes an inverting circuit for left-to-right inverting the generated image,
   wherein the generated image is projected from the projection module to the image output module without reflection by a mirror through a rear projection scheme,
   wherein the image output module is positioned ahead of the case, and is directly connected with the case, and
   wherein the projection module is positioned behind the case.

7. The display apparatus of claim 6, wherein the particular pattern is any one of a shadow mask pattern, an aperture grille pattern; or a slot mask pattern.

8. The display apparatus of claim 6, wherein a shape of the image projection module and the case is varied by adjusting an area where an image is projected and an area where the image is blocked.

9. The display apparatus of claim 2, wherein the scan line forming module further includes a color filter and enables the image projected from the projection module to have a color by transmitting the light from the light source through the color filter.

10. The display apparatus of claim 1, wherein the projection module is detachably or integrally connected with the case.

11. The display apparatus of claim 1, wherein the scan line forming module includes a micro-mirror array including at least one micro-mirror, a processor functionally connected with the micro-mirror array, and a memory for previously retaining a particular pattern for forming the scan line, and wherein the memory transfers the particular pattern to the processor to form the scan line, and the processor performs control to form the scan line according to the particular pattern by controlling a rotation angle of the micro-mirror to switch on or off the pixel corresponding to the micro-mirror.

12. The display apparatus of claim 1, wherein the scan line forming module is used when forming the scan line on the image output module of the display apparatus and is stopped from use when forming no scan line.

13. The display apparatus of claim 6, wherein the projection module is detachably or integrally connected with the case.

* * * * *